United States Patent [19]

Reiher

[11] 4,301,695
[45] Nov. 24, 1981

[54] RECIPROCATING PISTON MACHINE

[76] Inventor: John H. Reiher, 1071 Nakomis, Lake Orion, Mich. 48035

[21] Appl. No.: 112,133

[22] Filed: Jan. 14, 1980

[51] Int. Cl.³ .............................................. F16C 3/30
[52] U.S. Cl. ...................................... 74/602; 74/594; 123/78 F
[58] Field of Search ............ 74/571 R, 571 M, 579 E, 74/594, 602, 601; 123/78 E, 78 F, 197 AC, 197 AB, 48 B

[56] References Cited
U.S. PATENT DOCUMENTS

| 1,111,252 | 9/1914 | Eagle | 123/78 F |
|---|---|---|---|
| 1,162,710 | 11/1915 | Powell | 123/78 F |
| 1,326,129 | 12/1919 | Chadbourne | |
| 1,553,009 | 9/1925 | Stuke | |
| 1,931,705 | 10/1933 | Peterson | |
| 1,964,096 | 6/1934 | Tucker | |
| 2,356,033 | 8/1944 | Criddle | |
| 3,087,342 | 4/1963 | Caddell | |
| 3,686,972 | 8/1972 | McWhorter | |
| 3,861,239 | 1/1975 | McWhorter | |
| 4,044,629 | 8/1977 | Clarke | 74/579 E |
| 4,085,628 | 4/1978 | McWhorter | 74/602 |
| 4,152,955 | 5/1979 | McWhorter | 74/602 |

Primary Examiner—Kenneth Dorner
Attorney, Agent, or Firm—Lon H. Romanski

[57] ABSTRACT

A reciprocating piston machine, shown as having a crankshaft with a crank-pin offset from the axis of rotation of the crankshaft and a connecting rod pivotally connected at the end thereof remote from the crank-pin to a piston reciprocatingly received within a cylinder, has first and second eccentric bearings journalled with respect to each other and operatively collectively carried by the crank-pin and situated as to be generally between the crank-pin and the cooperating end of the related connecting rod; one of the eccentric bearings is rotated generally with the crank-pin and completely within the cooperating end of the connecting rod by the crankshaft during each full rotation of the crankshaft while the crank-pin undergoes one full rotation with respect to the other of the eccentric bearings for each full rotation of the crankshaft.

28 Claims, 17 Drawing Figures

RECIPROCATING PISTON MACHINE

FIELD OF THE INVENTION

This invention relates generally to reciprocating piston machines wherein a crankshaft has an eccentrically disposed crank-pin operatively connected to the piston as through associated connecting rod means, and more particularly to means associated therewith for altering the characteristics of the stroke of such piston.

BACKGROUND OF THE INVENTION

Heretofore it has, generally, been known that in, for example, reciprocating piston type internal combustion engines improved engine power, improved fuel efficiency and other attendant benefits could be derived if the characteristics of the piston stroke could be modified. The prior art has proposed various means for altering such piston stroke characteristics as, for example: (a) altering the overall length of stroke of the piston; (b) altering the speed of travel of the piston during selected portions of its stroke; (c) effectively stopping the movement of the piston during selected portions of its stroke as possibly at the top of its stroke in order to prolong its stay at the top for a time longer than it would otherwise experience and (d) altering the top of the piston stroke during alternate strokes.

In proposing such means, the prior art has proposed the employment, generally, of various means whereby, in the main, the objective was to alter the distance as between the center of the crankshaft crank-pin and the wrist pin of the related piston (or the top of the related piston) as the crankshaft underwent rotation and the associated piston underwent reciprocation. Even though such a concept is generally valid, the prior art, nevertheless, has proposed various means which are very complex, costly and not totally reliable with the result being that such prior art structures have not been adopted especially where the results desired are to occur in relatively high speed engines of relatively high horsepower rating.

The prior art, as illustrated and disclosed by, for example, United States of America Letters Patent Nos.: (a) 1,111,252 dated Sept. 22, 1914; (b) 1,162,710 dated Nov. 30, 1915; (c) 1,326,129 dated Dec. 23, 1919; (d) 1,553,009 dated Sept. 8, 1925; (e) 1,931,705 dated Oct. 24, 1933; (f) 1,964,096 dated June 26, 1934; (g) 2,356,033 dated Aug. 15, 1944; (h) 3,087,342 dated Apr. 30, 1963; (i) 3,686,972 dated Aug. 29, 1972; (j) 3,861,239 dated Jan. 21, 1975 and (k) 4,044,629 dated Aug. 30, 1977, employ such means as, for example: complicated cam follower grooves or tracks; bevel gears; ring and sun gears for driving an eccentric; a rotatable eccentric wrist pin; spring-loaded plunger-like means for permitting a lost motion connection as between the crankshaft crank-pin and associated piston; sliding bearing block means carried by the connecting rod at its end intended for connection to the crank-pin and cooperating gear and chain drives for driving an eccentric in order to achieve an altered piston stroke. As hereinbefore stated, such means as proposed by the prior art have not been accepted and it is believed that such lack of acceptance is at least in part due to the high cost of such prior art structures and the complicated nature thereof as well as, often, requiring too much space within the engine. The provision of various gearing means as proposed by the prior art also adds to the creation of engine vibrations which are undesirable.

Accordingly, the invention as herein disclosed, described and claimed is primarily directed to the solution of at least certain of the problems of the prior art and to provide for a simple and yet effective arrangement whereby a much more efficient mechanical utilization of, for example, the combustion gases in a piston engine as during the power stroke of the related piston.

SUMMARY OF THE INVENTION

According to the invention, a reciprocating piston machine having a crankshaft with a crank-pin offset from the axis of rotation of the crankshaft and a connecting rod pivotally connected, at the end thereof remote from the crank-pin, to a piston reciprocatingly received within a cylinder, has means for causing the axis of pivoting of the connecting rod on the crank-pin to be offset laterally from the longitudinal axis of the crank-pin, the said means comprises first and second eccentric journals or bearings each situated generally between the crank-pin and the cooperating end of the related connecting rod, wherein one of the eccentric journals is rotated with the crank-pin and completely within the cooperating end of the connecting rod by the crankshaft during each full rotation of the crankshaft, and wherein said crank-pin undergoes one full rotation with respect to the other of the eccentric journals for each full rotation of the crankshaft while the said other of the eccentric journals is prevented from experiencing full rotation.

Various general and specific objects, advantages and aspects of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be omitted from one or more views.

DETAILED DESCRIPTION OF THE PREFERRED EMBODIMENT

Figure 1:
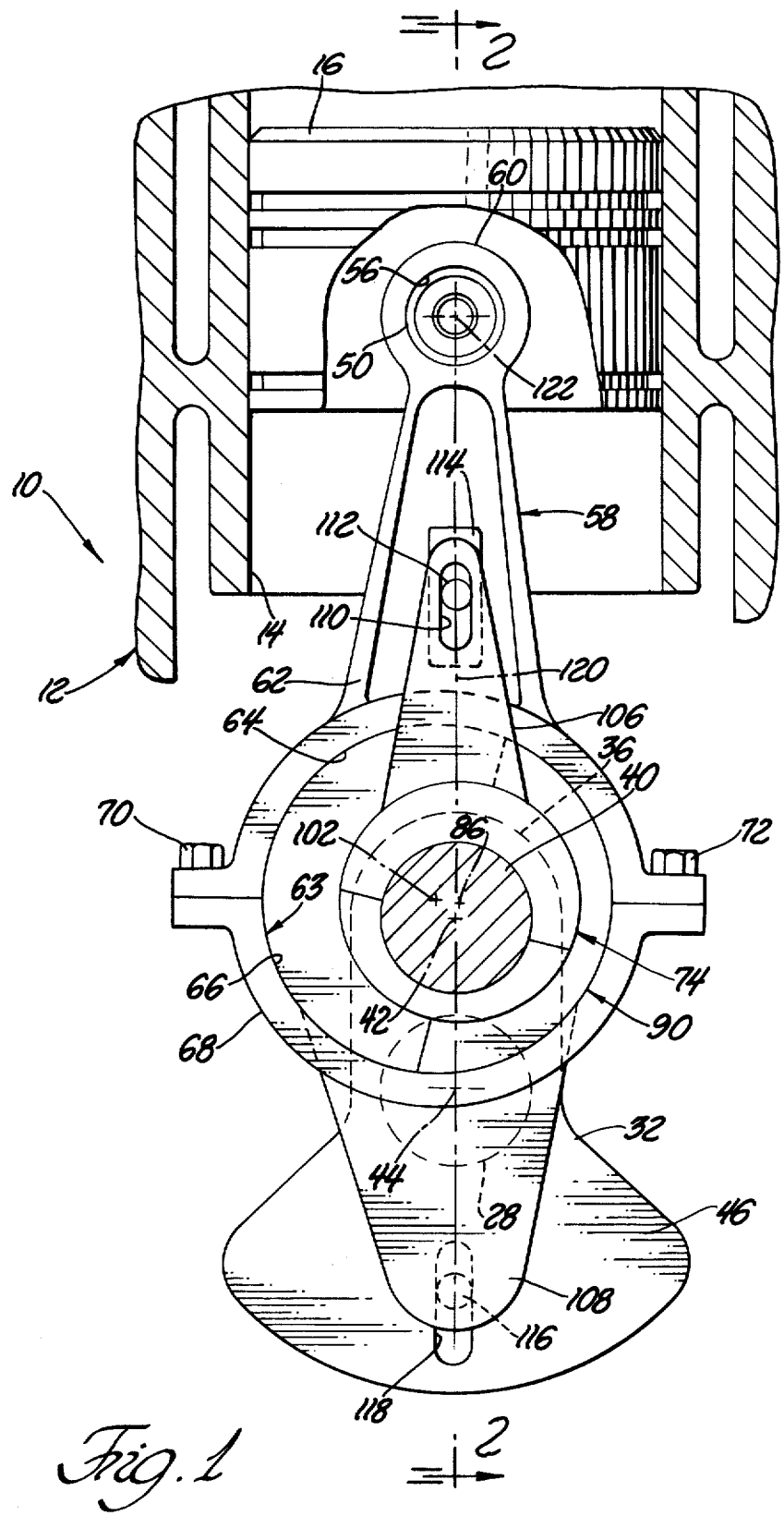
FIG. 1 is a generally sectional view taken through a portion of a reciprocating piston machine employing teachings of the invention with such sectional view being taken as on the plane of line 1—1 of FIG. 2 and looking in the direction of the arrows.
Figure 2:
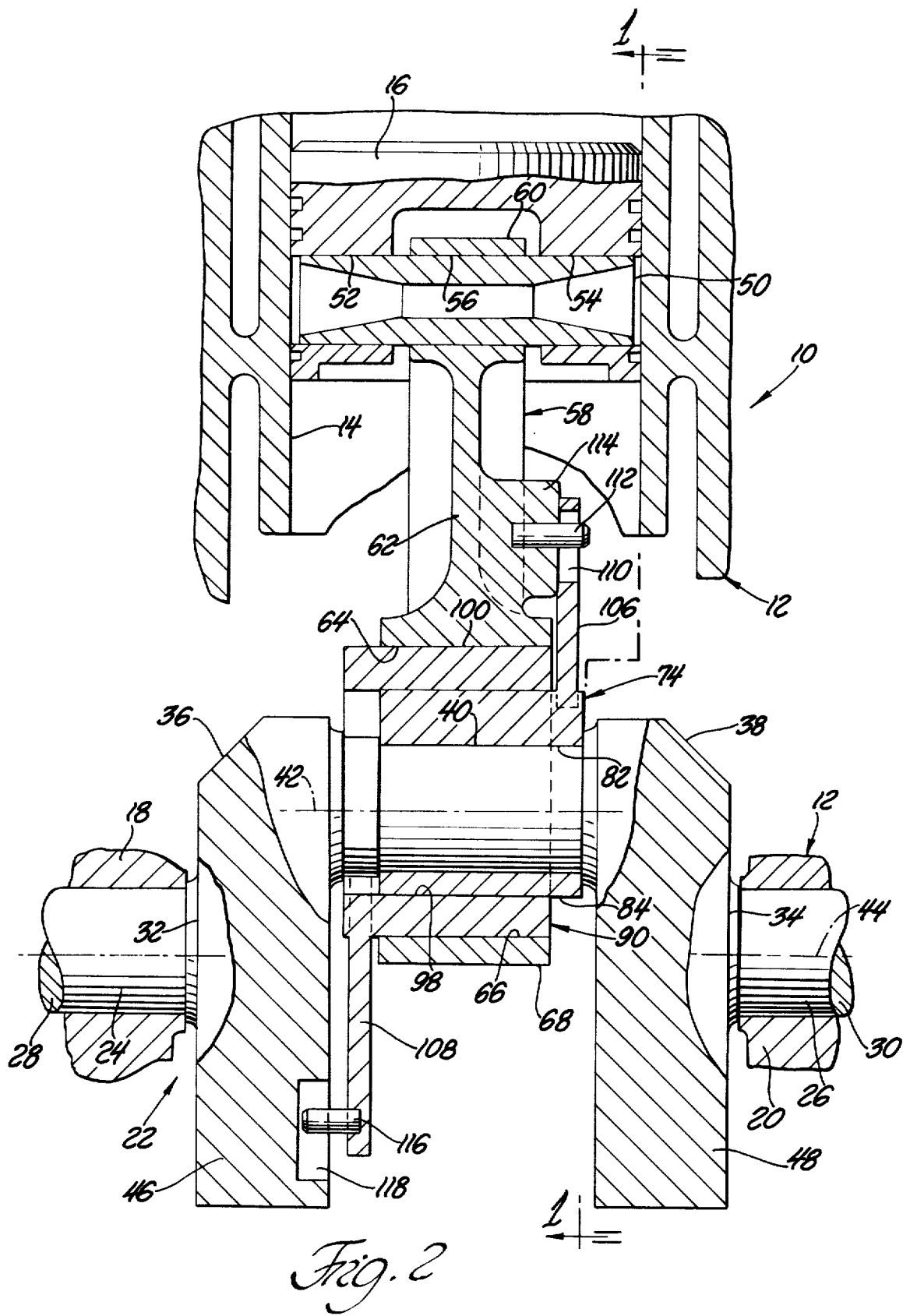
FIG. 2 is a cross-sectional view taken generally on the plane of line 2—2 of FIG. 1 and looking in the direction of the arrows.

Referring now in greater detail to the drawings, FIGS. 1 and 2 illustrate a reciprocating piston machine 10 as comprising machine housing or body means 12 which, in turn, may comprise a cylinder 14 for reciprocatingly receiving a piston 16 therein (the associated piston rings not being shown) and journal or bearing portions 18 and 20 for rotatably supporting related crankshaft means 22 as at cooperating bearing surfaces 24 and 26 on shaft portions 28 and 30 of crankshaft means 22.

The crankshaft means 22 is depicted as comprising a pair of generally transversely extending arms 32 and 34, respectively connected to crankshaft portions 28 and 30, with the upper (as viewed in FIG. 2) arm portions 36 and 38 combining to support a crank-pin portion 40, the axis 42 of which is parallel and eccentrically disposed with respect to the axis 44 of rotation of crankshaft means 22. The lower (as viewed in FIG. 2) arm portions 46 and 48 serve as counterweights for counter-balancing the weight of upper arm portions 36, 38, the crank-pin 40 and other elements connected thereto.

A generally tubular cylindrical wrist pin member 50, suitably retained within cooperating passages 52 and 54 of the body of piston 16, extends through an aperture 56 in a connecting rod 58 as to thereby pivotally interconnect the upper (as viewed in either FIGS. 1 or 2) end 60 of connecting rod 58 to the piston 16. A connecting rod arm or body portion 62 serves to interconnect the upper end 60 to the lower end which defines a cylindrical bearing surface 63 comprised as of a semi-cylindrical upper bearing surface 64, formed as in the body portion 62, and a second semi-cylindrical 66 formed as in a separate bearing cap-like member 68 suitably secured to the main body portion of the connecting rod 58 as by screws 70 and 72.

Figure 9:
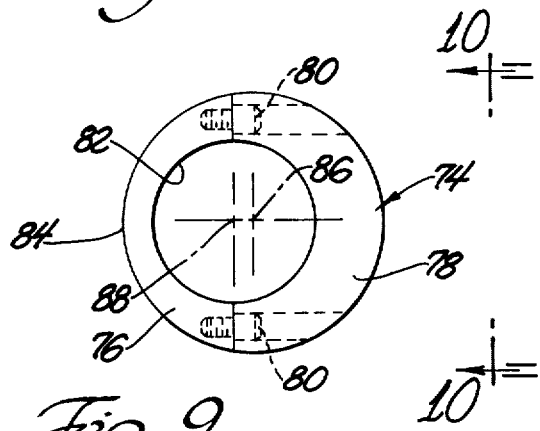
FIG. 9 is an axial end elevational view of the other of the eccentric bearings shown in any of FIGS. 1–6.
Figure 10:
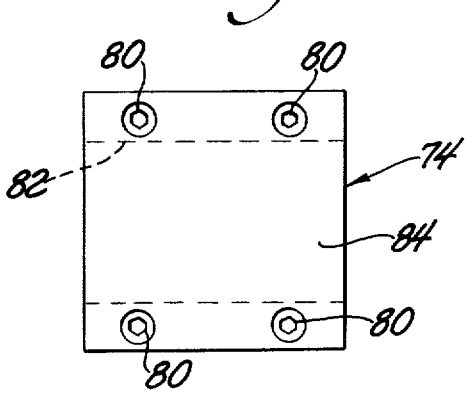
FIG. 10 is an elevational view taken generally on the plane of line 9—9 of FIG. 9 and looking in the direction of the arrows.

A first eccentric means or bearing 74 is situated on and about crank-pin 40 as to be relatively rotatable with respect thereto. As best illustrated in FIGS. 9 and 10, especially in those situations where the crankshaft means 22 is of the solid or one-piece type (as compared to a segmented assembled type crankshaft) the eccentric bearing 74 may be of the split-type having cooperating sections 76 and 78 which may be detachably secured to each other, as by screws or bolts 80, to cooperatingly define an inner cylindrical bearing surface 82 (received on the cooperating bearing surface of crank-pin 40) and an outer cylindrical bearing surface 84 which has its axis 86 parallel to but eccentrically disposed with respect to axis 88 of bearing surface 82. Axis 88, when viewed, for example, in either FIG. 1 or 2, would be coincident with axis 42.

Figure 7:
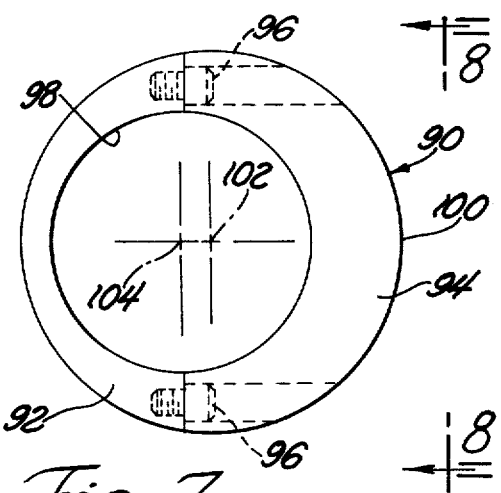
FIG. 7 is an axial end elevational view of one of the eccentric bearings shown in any of FIGS. 1–6.
Figure 8:
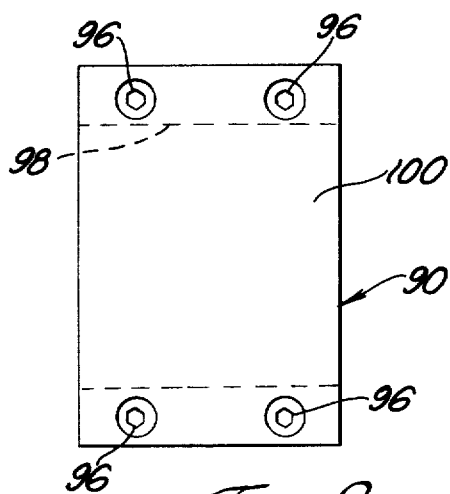
FIG. 8 is an elevational view taken generally on the plane of line 8—8 of FIG. 7 and looking in the direction of the arrows.

A second eccentric means or bearing 90 is situated on and about the first eccentric 74 as to be relatively rotatable with respect thereto. As also best shown in FIGS. 7 and 8, especially in those situations where the crankshaft means 22 is of the solid or one-piece type (as compared to a segmented assembled type crankshaft) the eccentric 90 may be of the split-type having cooperating sections 92 and 94 which may be detachably secured to each other, as by screws or bolts 96, to cooperatingly define an inner cylindrical bearing surface 98 (received on the cooperating bearing surface 84 of eccentric 74) and an outer cylindrical bearing surface 100 which has its axis 102 parallel to but eccentrically disposed with respect to axis 104 of inner bearing surface 98. As viewed in, for example, FIG. 1, axes 104 and 86 would be coincident.

As shown in, for example, FIGS. 1 and 2, eccentrics 74 and 90 are respectively provided with control arms or levers 106 and 108, respectively. For purposes of clarity and ease of understanding, such arms 106 and 108 are illustrated as being integrally formed with the respective eccentrics 74 and 90; however, it should be apparent that such arms 106 and 108 could be made separately from the eccentrics 74 and 90 and then operatively fixedly secured thereto as by, for example: welding or brazing; or by being secured by screws or the like and such could be done generally as at the outer periphery of the respective eccentrics 74 and 90 or at an axial end face of the respective eccentrics 74 and 90. In any event, as depicted by FIGS. 1 and 2, arms 106 and 108 are respectively fixedly carried by eccentric 74 and 90.

The generally outer end of arm 106 is provided as with a generally elongated slot 110 which slidably guides itself against, and receives, a guide pin 112 which may be fixedly carried as by a boss-like portion 114 formed as on body 62 of connecting rod 58.

The generally outer end of arm 108 is provided with a pin-like member 116 which is slidably received within a guide or drive slot 118 formed as within the lower arm portion 46 of transverse crankshaft arm means 32. As depicted in FIG. 1, the elongated drive slot 118 is radially extending with respect to the axis of rotation 44 of crankshaft means 22 and crankshaft portion 28. In the preferred embodiment, as illustrated in, for example, FIG. 1, the centerline 120 of cylinder 14 (and therefore the axis of motion of piston 16) passes through the axis 42 of crank-pin 40 and through axis 44 of crankshaft means 22 when crank-pin 40 is in its depicted top-dead-center (TDC) position.

OPERATION OF INVENTION

As should be apparent, FIGS. 3, 4, 5 and 6 illustrate the positions assumed by the respective elements at arbitrarily selected conditions of operation. With FIG. 1 depicting the positions of the various elements when the crank-pin 40 is at its TDC, FIGS. 3, 4, 5 and 6 respectively depict the positions of the same elements (only so many thereof as is necessary to understand the operation thereof) when the crankshaft means 22, and therefore crank-pin 40, has been rotated (clockwise as viewed in FIGS. 1, 3, 4, 5 and 6): 15.0°; 90°; 180° and 270° about the axis 44.

Generally, if FIGS. 1-6 are sequentially considered, it can be seen that as the crankshaft means 22 and crank-pin 40 experiences one complete revolution, arm 108, which is operatively connected to the crankshaft means 22 as via pin means 116 and fixedly secured to the outer or larger eccentric bearing means 90, causes the eccentric bearing 90 to experience one complete revolution about, generally, axis 42 of the crank-pin 40 and, more specifically, about the inner or smaller eccentric bearing means 74. Also, as the crankshaft means 22 and crank-pin 40 undergo one complete revolution about axis 42, the inner eccentric bearing means 74 is prevented from itself experiencing rotation because of lever arm means 106 fixedly secured thereto and operatively engaged as with fixed pin 112. However, as also should be apparent, inner eccentric bearing 74 is permitted to undergo what may be termed two degrees of motion as with respect to the bearing surface 63 of the connecting rod means 58. That is, arm or lever 106 along with inner eccentric 74 may, in unison, pivot about the axis of pin 112 (thereby at times, as viewed in any of FIGS. 1 and 3-6, swingably move toward the right or toward the left relative to the bearing surface 63) and, because of the elongated nature of slot 110 in arm 106, the arm or lever 106 along with inner eccentric 74 may, in unison, slide with respect to pin 112 (thereby at times, as viewed in any of FIGS. 1 and 3-6, move downwardly or upwardly relative to bearing surface 63).

Further, it is obvious that the radius of rotation of each portion of slot 118 will be constant as the crankshaft means 22 and crank-pin 40 complete one revolution about axis 44. However, the radius of rotation of drive pin 116 will not be constant and will vary as generally depicted in FIGS. 1 and 3-6. For example, in comparing FIGS. 1 and 4 it can be seen that in FIG. 4 the radially outermost end of arm 108 more nearly fully covers the slot 118 and, in then comparing FIG. 5 it can be seen that in that depicted condition the radially outermost end of arm 108 has fully covered the slot 118 while in FIG. 6, the radially outermost end of arm 108 has uncovered just a very slight portion of slot 118. Whether the slot 118 is covered from view or uncovered is not material; however, since its radius of rotation is constant, any relative radial motion between such slot 118 and arm 108 can be brought about only by the relative radial motion of the arm 108 and the eccentric bearing means 90 fixedly secured thereto.

Referring again to FIG. 1, and then sequentially considering FIGS. 3, 4, 5 and 6, the instant that crankshaft means 22 starts to rotate clockwise about its axis 44, outer eccentric means 90 will simultaneously start to rotate clockwise about inner eccentric 74 and the crank-pin 40 generally contained therewithin. As such rotation continues and reaches the FIG. 3 position, it can be seen that the radially thicker portion of outer eccentric 90 has rotated to a position where it is more nearly completely between the inner eccentric 74 and the axis 122 of the wrist pin 50 thereby effectively somewhat lengthening the distance between wrist pin axis 122 and axis 42 of crank-pin 40. As rotation of crankshaft means 22 continues, the radially thickest portion of outer eccentric 90 finally passes between the inner eccentric 74 and axis 122 of wrist pin 50 as the crankshaft means 22 approaches the position depicted in FIG. 4. As such radially thickest portion of eccentric 90 thusly passes between axes 122 and 42, the distance therebetween is extended to a maximum amount. In the FIG. 4 condition, the outer eccentric 90 is depicted as having been rotated as to already have its radially thickest portion passing out of alignment between axes 122 and 42.

Figure 5:
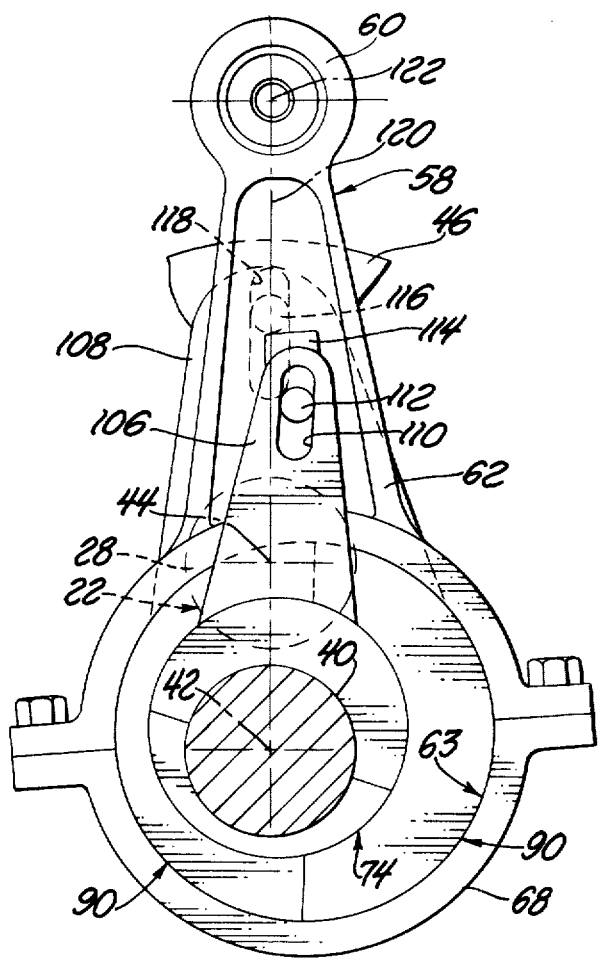
FIG. 5 is a view of the same elements shown in FIGS. 3 and 4 but illustrated in a fourth selected position of operation different from that of FIGS. 1, 2, 3 and 4.
Figure 6:
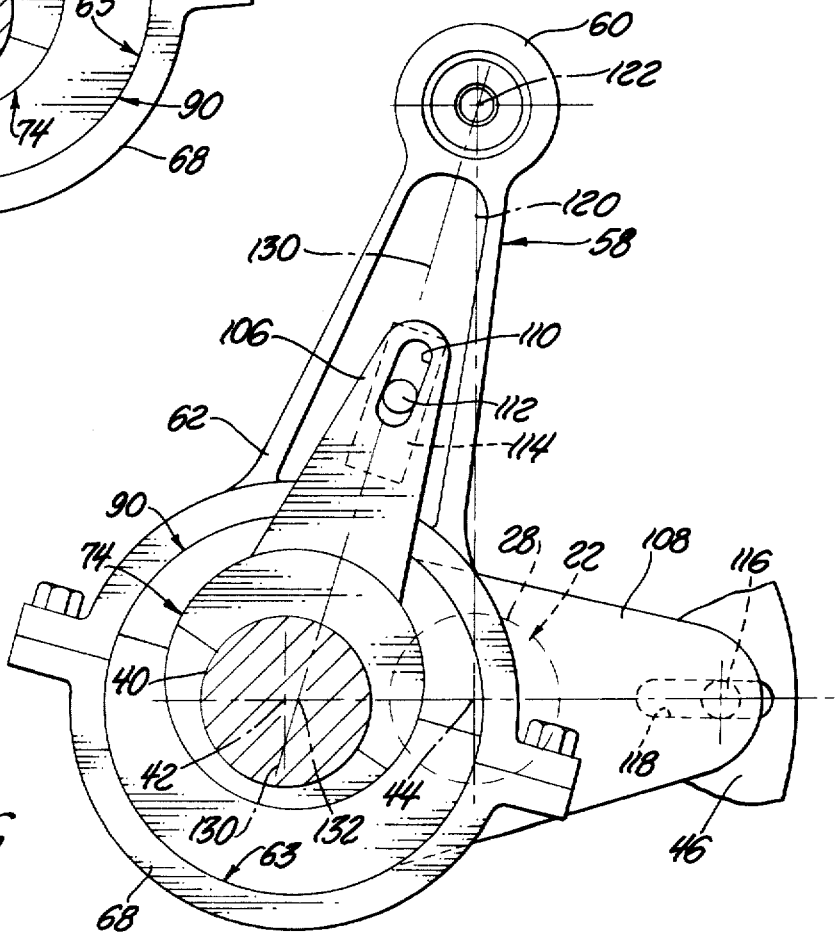
FIG. 6 is a view of the same elements shown in FIGS. 3, 4 and 5 but illustrated in a fifth selected position of operation different from that of FIGS. 1, 2, 3, 4 and 5.

Upon continued rotation of crankshaft means 22, outer eccentric means 90 continues its rotation about inner eccentric 74 and, as the crankshaft means 22 attains its FIG. 5 depicted position, the radially thickest portion of outer eccentric means 90 is disposed generally to the right (as viewed in FIG. 5) of the inner eccentric 74 thereby resulting in the inner eccentric means 74 being, generally, most closely disposed at its left side (as viewed in FIG. 5) to the connecting rod bearing surface 63. It should be clear that the inner eccentric bearing means 74 is not made to move toward the bearing surface 63 but rather the bearing surface 63 is made to move toward the inner eccentric means 74 by virtue of the radially thickest portion of the outer eccentric means 90 passing between the right side (as viewed in FIG. 5) of the inner eccentric bearing 74 and the coacting portion of the bearing surface means 63. As rotation of crankshaft means 22 continues, the radially thickest portion of outer eccentric 90 finally passes between the generally bottom portion (as viewed in FIG. 6) of inner eccentric 74 and cooperating connecting rod bearing surface 63 as to be in general alignment with axes 42 and 122, as depicted in FIG. 6, with the result that the distance between axis 42 and axis 122 is made, generally, the shortest distance. Of course, 90° further rotation of crankshaft means 22 results in the respective elements again assuming the positions depicted in FIG. 1.

Further, by way of example and not of limitation, if in the embodiment of FIGS. 1-6, the following is assumed: (a) the outer diameter of outer eccentric bearing means 90 being 2.50 inches; (b) the inner diameter 98 of outer eccentric 90 being, nominally, 1.75 inches; (c) the axes of the outer diameter 100 and inner diameter 98 being offset from each other by 0.1875 inches; (d) the outer diameter 84 of inner eccentric bearing means being, nominally, 1.75 inches; (e) the inner diameter 82 of inner eccentric bearing means being, nominally, 1.125 inches; (f) the axes of the outer diameter 84 and inner diameter 82 being offset from each other by 0.125 inches; (g) the outer diameter of crank-pin 40 being, nominally, 1.125 inches; (h) the distance between axis 42 and 44 being 1.25 inches; (i) the distance between crank-pin axis 42 and wrist pin axis 122 is 4.406 inches when the crank-pin 40 is in its TDC position of FIG. 1, and (j) the distance between crankshaft axis 44 and wrist pin axis 122 is 5.656 inches when the crank-pin 40 is in its TDC position of FIG. 1, then it can be seen, with the same applied measurements that there has been no downward movement of wrist pin axis 122 (and therefore piston 16) toward axis 44 of crankshaft means 22 during the time that the crankshaft means 22 has rotated from its FIG. 1 position to its FIG. 3 position since the center distance as between wrist pin axis 122 and crankshaft axis 44 remains virtually the same, namely, 5.656 inches. This is brought about by the fact that as crankshaft means 22 undergoes that degree of rotation, the radially thickest portion of outer eccentric means 90 is beginning to move generally between the rotated crank-pin 40 and the wrist pin axis 122 thereby in effect "making-up" the distance which crank-pin 40 has moved downwardly relative to its TDC position. Such a non-moving or standing piston continues to be stationary or substantially stationary for some additional degrees of crankshaft rotation beyond the FIG. 3 position since, in the embodiment disclosed, the radially thickest portion ("high spot") of the outer eccentric means 90 has not yet fully come between crank-pin 40 and wrist pin axis 122.

Figure 3:
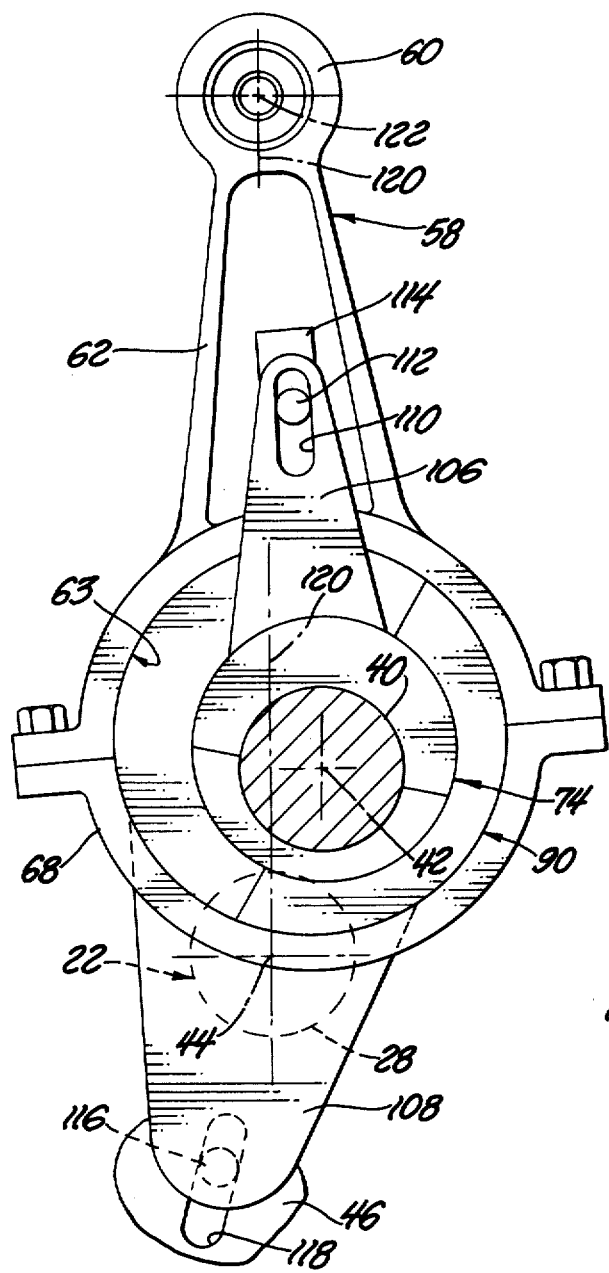
FIG. 3 is a view of certain of the elements of FIGS. 1 and 2 illustrated at a second selected position of operation different from that of FIG. 1.
Figure 4:
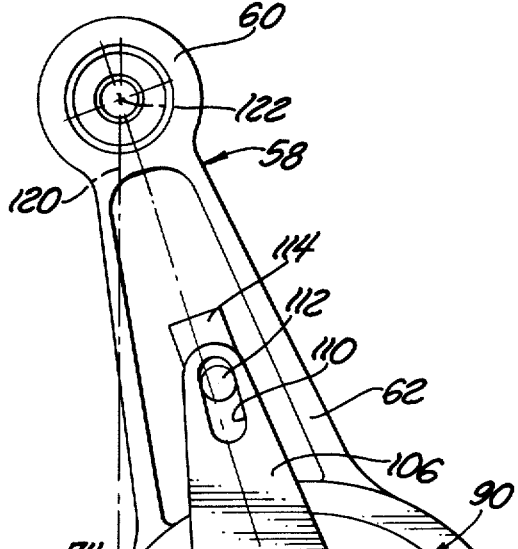
FIG. 4 is a view of the same elements shown in FIG. 3 but illustrated in a third selected position of operation different from that of FIGS. 1, 2 and 3.

As previously generally described, as crankshaft means 22 rotation continues from the FIG. 3 position toward the FIG. 4 position, the "high spot" of the outer eccentric means 90 starts to pass generally about the right side (as viewed in FIG. 4) of the inner eccentric means 74 and crank-pin 40. As a consequence thereof the axis 102 of the outer surface (outer diameter) 100 of eccentric bearing means 90 moves generally radially outwardly with respect to crankshaft axis 44 and becomes a radial distance greater than the distance between crankshaft means axis 44 and crank-pin axis 42. This, in turn, causes the tangential velocity of axis 102 to be greater than the tangential velocity of crank-pin axis 42 resulting in a related increased velocity of wrist pin axis 122 (and piston 16) toward crankshaft means 22 axis 44. Further, if a line 124 of reaction force is drawn as through wrist pin axis 122 and axis 102, it can be seen that such force line 124 intersects the horizontal line 126, passing through axes 42 and 44, at a point 128 which is, under the previously assumed exemplory dimensions, 0.125 inch further radially outwardly disposed with respect to the axis 44 than is axis 42. Accordingly, the FIG. 4 position pictorially illustrates that not only is the piston 16 velocity increased but that the torque applied by piston 16 to the crankshaft means 22 is increased by a torque lever arm increase. Further, when in the FIG. 4 position, and employing the same assumed dimensions and measurements, the distance between wrist pin axis 122 and crankshaft means axis 44 would be in the order of 4.375 inches.

With continued rotation of the crankshaft means 22, from the FIG. 4 to the FIG. 5 position, the outer eccentric bearing means 90 continues its rotation as to assume a position, as depicted in FIG. 5, where the "high spot " of the eccentric means 90 is disposed, in the main, to the right (as viewed in FIG. 5) of the inner eccentric means 74. In the FIG. 5 position, the crank-pin 40 is in its BDC position. Again, employing the same assumed dimensions and measurements, in the FIG. 5 position, the distance between wrist pin axis 122 and crankshaft means axis 44 would be in the order of 3.063 inches. Accordingly, it can be seen that while the axis 42 of crank-pin 40 moved downwardly a distance of 1.250 inches (from the FIG. 4 to the FIG. 5 BDC position) wrist pin axis 122 (and therefore piston 16) actually moved 1.312 inches downwardly, or, 0.063 inches further than axis 42 of crank-pin 40. Since the downward distances traveled by both the axis 122 (piston 16) and axis 42, as between the FIG. 4 and FIG. 5 positions, occur in the same span of time, it is then obvious that the average downward velocity of axis 122 (piston 16) must be greater than that of axis 42 and that such increased velocity is due to the "high spot" of the eccentric means 90 being rotated from a position generally between crank-pin 40 and axis 122 (depicted in FIG. 4) to a position generally to the right of crank-pin 40 (depicted in FIG. 5).

With further rotation of the crankshaft means 22, from the FIG. 5 to the FIG. 6 position, the outer eccentric bearing means 90 continues its rotation as to assume a position, as depicted in FIG. 6, wherein the "high spot" of the eccentric means 90 is disposed at a side of the inner eccentric means 74 and crank-pin 40 generally opposite to wrist pin axis 122 thereby, in effect, shortening the distance as between axis 42 and axis 122 and, therefore, between wrist pin axis 122 and crankshaft means 22 axis 44. That is, employing the same assumed dimensions and measurements, in the FIG. 6 position, the distance between wrist pin axis 122 and crankshaft means axis 44 would be in the order of 3.969 inches. It should be noted that the FIG. 4 position depicts the structure at 90° of rotation whereas the FIG. 6 position depicts the structure at 270° of rotation (180° apart). Accordingly, even though wrist pin axis 122 (piston 16) moved a total of 1.312 inches downwardly from the FIG. 4 to the FIG. 5 positions, the wrist pin axis 122 (piston 16) moved only 0.906 inches upwardly from the FIG. 5 to the FIG. 6 positions, or, a difference of 0.406 inch. Since the upward distances traveled by both the axis 122 (piston 16) and axis 42 occur in the same span of time, it then becomes obvious that the average upward velocity of axis 122 (piston 16) must be less than that of axis 42 and that such decreased velocity is due to the "high spot" of the eccentric means 90 being rotated from a position generally to the right of the crank-pin 40 (FIG. 5) to a position generally on the opposite side of crank-pin 40 with respect to wrist pin axis 122. As a consequence of the relatively slower travel of wrist pin axis 122 (piston 16) the force applied by the crank-pin 40 to the piston 16, during such portion of travel, is relatively increased. Further, if a force line 130 is drawn as to pass through wrist pin axis 122 and axis 102 such will intersect the horizontal line 126 as at a point 132 which is, under the previously assumed exemplory dimensions, in the order of 0.094 inch further radially inwardly (with respect to crankshaft axis 44) than is axis 42 of crank-pin 40. Consequently, any flywheel or the like associated with the crankshaft means 22 serving to move the piston upwardly in its compression, exhaust or pumping stroke is better able to provide such movement because of the reduced lever-arm (from point 132 to axis 44) and therefore, effectively, a resulting increased force.

With still further rotation of the crankshaft means 22, from the FIG. 6 back to the FIG. 1 position, the outer eccentric means 90 continues its rotation as to again assume a position as depicted in FIG. 1 wherein the "high spot" of eccentric means 90 is generally to the left of eccentric means 74 and crank-pin 40 and, generally, opposite to that as assumed in FIG. 5, thereby, in effect, again lengthening the distance as between crankshaft axis 44 and wrist pin axis 122 (piston 16). That is, employing the same assumed exemplory dimensions and measurements, in its downstroke, axis 122 moved in the order of a total of 2.593 inches while in half of the rotation of the crankshaft means 22 in its upstroke direction, the wrist pin axis 122 (piston 16) had moved in the order of only 0.906 inch (to the FIG. 6 position). Therefore, it is obvious that while crankshaft means 22 rotates from its FIG. 6 position back to its FIG. 1 position, the wrist pin axis 122 (piston 16) must travel 1.687 inches (2.593–0.906 inches) and that such difference in distance traveled by the piston 16 (as between FIG. 5 to FIG. 6 and FIG. 6 to FIG. 1) is achieved mainly by the continued rotation of eccentric means 90.

Generally, by way of summary, it can be seen that in the embodiment of FIGS. 1-6, and based on the assumed exemplory dimensions and measurements, the travel of piston 16 is virtually nil during the first approximately 15.0° of crankshaft rotation (from the crankpin's TDC position); during the next 75.0° of crankshaft rotation the average velocity of the piston 16 is 0.0171 inch per degree of crankshaft rotation; during the next following 90° of crankshaft rotation the average velocity of the piston 16 is 0.0145 inch per degree of crankshaft rotation; during the next following 90° of crankshaft rotation the average velocity of the piston 16 is 0.0100 inch per degree of crankshaft rotation and during the next following 90° of crankshaft rotation the average velocity of piston 16 is 0.0187 inch per degree of crankshaft rotation. Accordingly, it can be seen that in the embodiment of FIGS. 1-6, with the assumed exemplory dimensions, the highest average piston velocity (per degree of crankshaft rotation) occurs as between the positions depicted in FIGS. 6 and 1; the second average piston velocity (per degree of crankshaft rotation) occurs as between the positions depicted in FIGS. 3 to 4; the third highest average piston velocity (per degree of crankshaft rotation) occurs as between the positions depicted in FIGS. 4 and 5; and the slowest average piston velocity (per degree of crankshaft rotation) occurs as between the positions depicted in FIGS. 5-6.

As should now be totally apparent, the invention as illustrated in the embodiment of FIGS. 1-6 enables the piston to remain substantially stationary at its TDC position for an extended period of time thereby enabling, in cases of, for example, internal combustion engines, the combustible mixture within the combustion chamber to burn and increase its pressure (over that achieved by the prior art) before piston 16 starts to move downwardly (in response to such combustion pressure). As the piston 16 starts to move downwardly, its velocity is made to be the greatest and its effective lever of torque arm, with respect to the crankshaft axis, is made to increase thereby increasing the work delivered by the piston to the crankshaft means. The actual work applied by the piston is also increased by the fact that the actual length of stroke of the piston 16 is made to increase over the stroke as would otherwise be determined by the crank-pin 40 alone. Also, the average velocity of the piston 16 being made slower as between the 90° and 270° of crankshaft rotation positions, enhances the smooth operation of the engine and diminishes any tendency for "pounding" sensations or vibrations as may otherwise be induced into the engine or machine as at the bottom of the piston stroke.

MODIFICATIONS

Figure 11:
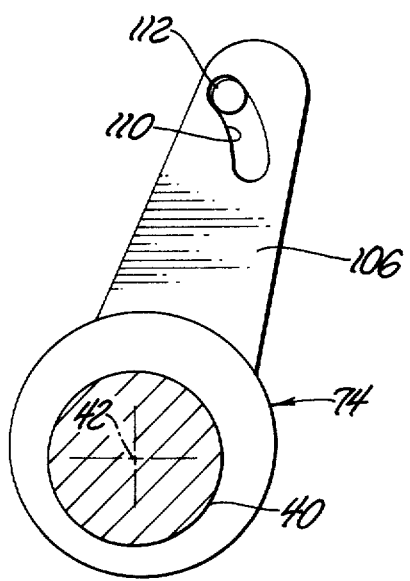
FIGS. 11 and 12 are each views of fragmentary portions of modifications of the structure as shown in FIGS. 1-6.
Figure 12:
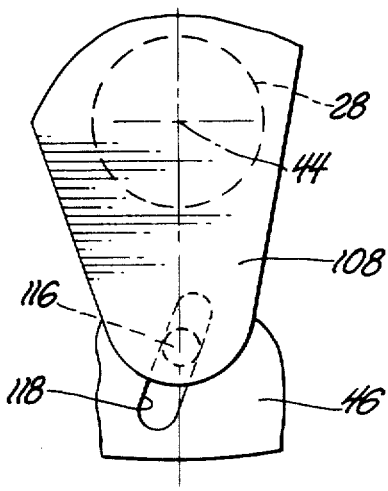

FIGS. 11 and 12, fragmentarily, illustrate modifications to the structure as shown in, for example, FIGS. 1-6. The elements in FIGS. 11 and 12 which are like or similar to those of FIGS. 1-10 are identified with like reference numbers. Only that much of such modifications is illustrated as is necessary for the complete understanding thereof. The remaining structure, not shown, may be assumed to be as that shown in, for example, FIGS. 1-6.

With reference to FIG. 11, it can be seen that the slot 110 in lever arm 106 is selectively contoured and made, generally, curvilinear. As was already pointed out with reference to FIGS. 1-6, bearing means 74 and arm 106 undergo some pivotal rotation about pin 112 as well as translational motion. Accordingly, if desired, selectively contoured slot means 110, as generally depicted in FIG. 11, may be provided whereby rotation of eccentric bearing means 74 with respect to crank-pin 40 is enhanced and increased during selected portions of the translational motion. By having such an arrangement, it would become possible, for example, to move point 128 (in FIG. 4) further radially outwardly because the thickest portion ("high spot") of eccentric means 74 could be turned more in that direction.

Similarly, because there is relative radial movement as between arm 108 and crankshaft portion 46, during rotation of the crankshaft means 22, slot 118 (as generally depicted in FIG. 12) may be inclined (skew) with respect to axis 44 thereby providing for additional control over the relative rate of rotation of eccentric means 90 at selected degrees of crankshaft rotation.

It is, of course, obvious that such modified slots 110 and 118 could be contoured in any desired configuration and that the essence of each of such is to provide for further degrees of control over the relative rotation of eccentric means 74 and 90.

SECOND EMBODIMENT OF INVENTION

FIGS. 13-17 illustrate a second embodiment of the invention. All elements in FIGS. 13-17 which are like or similar to those of FIGS. 1-12 are identified with like reference numbers provided with a suffix "a".

Referring now in greater detail to FIGS. 13-17, it can be seen that, in the main, the difference between the embodiment of FIGS. 1-10 and that of FIGS. 13-17 is that in FIGS. 13-17, instead of a slot 118 and pin 116 of FIGS. 1-6, a drive linkage 140 which is pivotally connected at one end, as by pivot connecting means 142, to the portion 46a of crankshaft means 22a and, connected at its other end, as by pivot connecting means 144, as to the axial end face (which is generally juxtaposed to portion 46a) of eccentric bearing means 90a.

Figure 13:
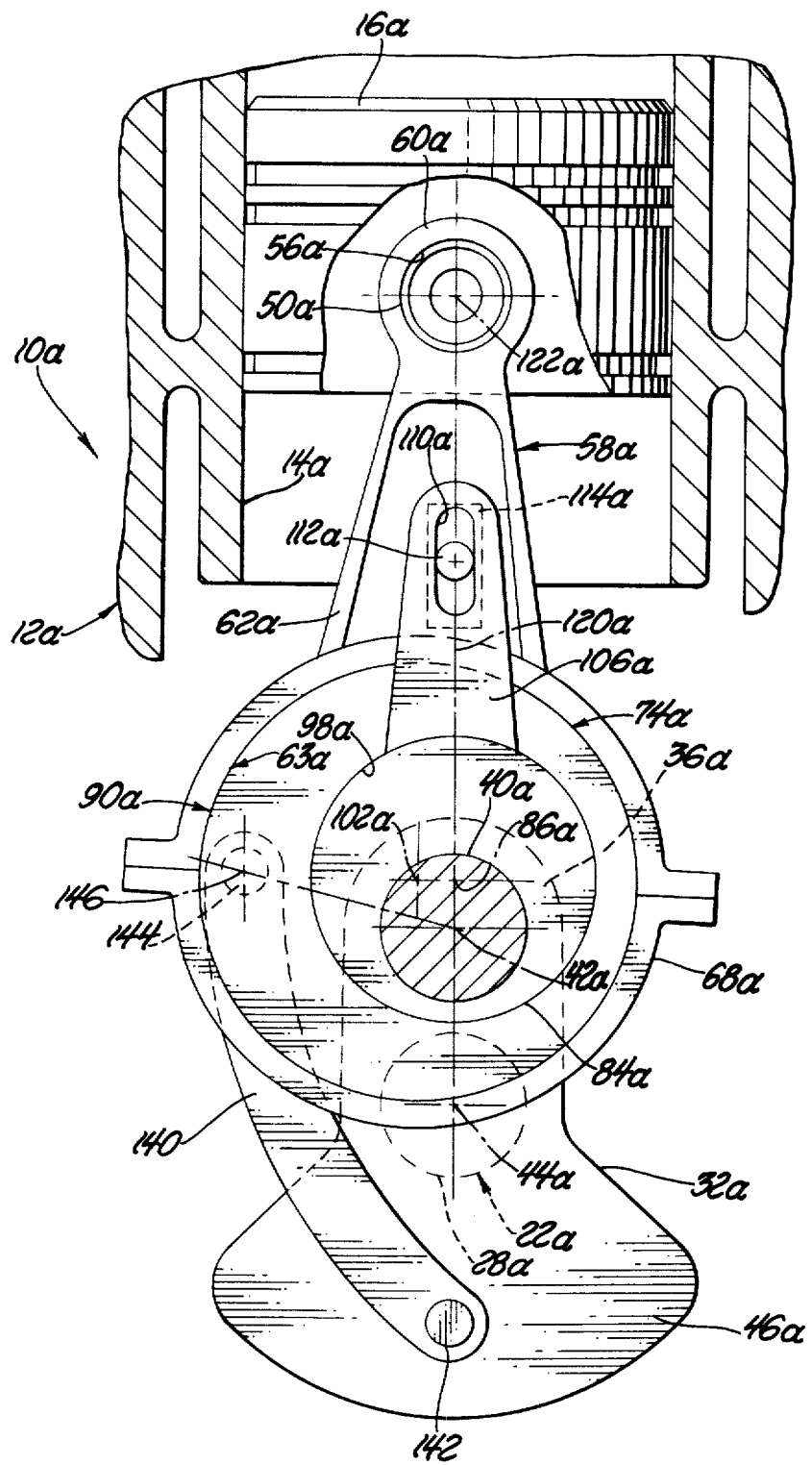
FIG. 13 is a view similar to that of FIG. 1 but illustrating a second embodiment of the invention.

As should be apparent, FIGS. 14, 15, 16 and 17 illustrate the positions assumed by the respective elements at arbitrarily selected conditions of operation. With FIG. 13 depicting the positions of the various elements when the crank-pin 40a is at its TDC, FIGS. 14, 15, 16 and 17 respectively depict the positions of the same elements (only so many thereof as is necessary to understand the operation thereof) when the crankshaft means 22a, and therefore crank-pin 40a, has been rotated (clockwise as viewed in FIGS. 13, 14, 15, 16 and 17): 22½°; 90°; 180° and 270° about the axis 44a.

Generally, if FIGS. 13-17 are sequentially considered, it can be seen that as crankshaft means 22a and crank-pin 40a experience one complete revolution, linkage 140, which is operatively connected to the crankshaft means 22a as via pin means 142 and pivotally secured to the outer or larger eccentric bearing means 90a, causes the eccentric bearing 90a to experience one complete revolution about, generally, axis 42a of the crank-pin 40a and, more specifically, about the inner or smaller eccentric bearing means 74a. Also, as the crankshaft means 22a and crank-pin 40a undergo one complete revolution about axis 42a, the inner eccentric bearing means 74a is prevented from itself experiencing total rotation because of lever arm means 106a fixedly secured thereto and operatively engaged as with fixed pin 112a. However, as also should be apparent, inner eccentric bearing 74a is permitted to undergo what may be termed two degrees of motion as with respect to the bearing surface 63a of the connecting rod means 58a. That is, arm or lever 106a along with inner eccentric 74a may, in unison, pivot about the axis of pin 112a (thereby at times, as viewed in any of FIGS. 13-17, swingably move toward the right or toward the left relative to bearing surface 63a) and, because of the elongated nature of slot 110a in arm 106a, the arm or lever 106a along with inner eccentric 74a may, in unison, slide with respect to pin 112a (thereby at times, as viewed in any of FIGS. 13–17, move downwardly or upwardly relative to bearing surface 63a).

Further, it is obvious that the radius of rotation of the center or axis of pin or pivot means 142 will be constant as the crankshaft means 22a and crank-pin 40a complete one revolution about axis 44a. However, the radius of rotation of drive or pivot pin 144 will not be constant and will vary as generally depicted in FIGS. 13–17. For example, in comparing FIGS. 13 and 17 it can be seen that in FIG. 13 the center of pin means 144 is further radially outwardly of axis 44a than is the center of pin means 144 in FIG. 17. Since the radius of rotation of pin means 142 is constant, any relative radial motion as between pin means 144 and axis 44a must be accompanied by appropriate rotation of eccentric means 90a relative to eccentric means 74a and crank-pin 40a.

Referring again to FIG. 13, and then sequentially considering FIGS. 14, 15, 16 and 17, the instant that crankshaft means 22a starts to rotate clockwise about its axis 44a, outer eccentric means 90a will simultaneously start to rotate clockwise about inner eccentric 74a and the crank-pin 40a generally contained therewithin. As such rotation continues and reaches the FIG. 14 position, it can be seen that the radially thicker portion of outer eccentric 90a has rotated to a position where it is more nearly approaching a position whereat it is more completely between the inner eccentric 74a and the axis 122a of the wrist pin 50a thereby effectively somewhat lengthening the distance between wrist pin axis 122a and axis 42a of crank-pin 40a. As rotation of crankshaft means 22a continues, the radially thickest portion of outer eccentric 90 finally passes between the inner eccentric 74a and axis 122a of wrist pin 50a as the crankshaft means 22a approaches the position depicted in FIG. 15. As such radially thickest portion of eccentric 90a thusly passes between axes 122a and 42a, the distance therebetween is extended to a maximum amount. In the FIG. 15 condition, the outer eccentric 90a is depicted as having been rotated as to already have its radially thickest portion passing out of alignment between axes 122a and 42a.

Figure 16:
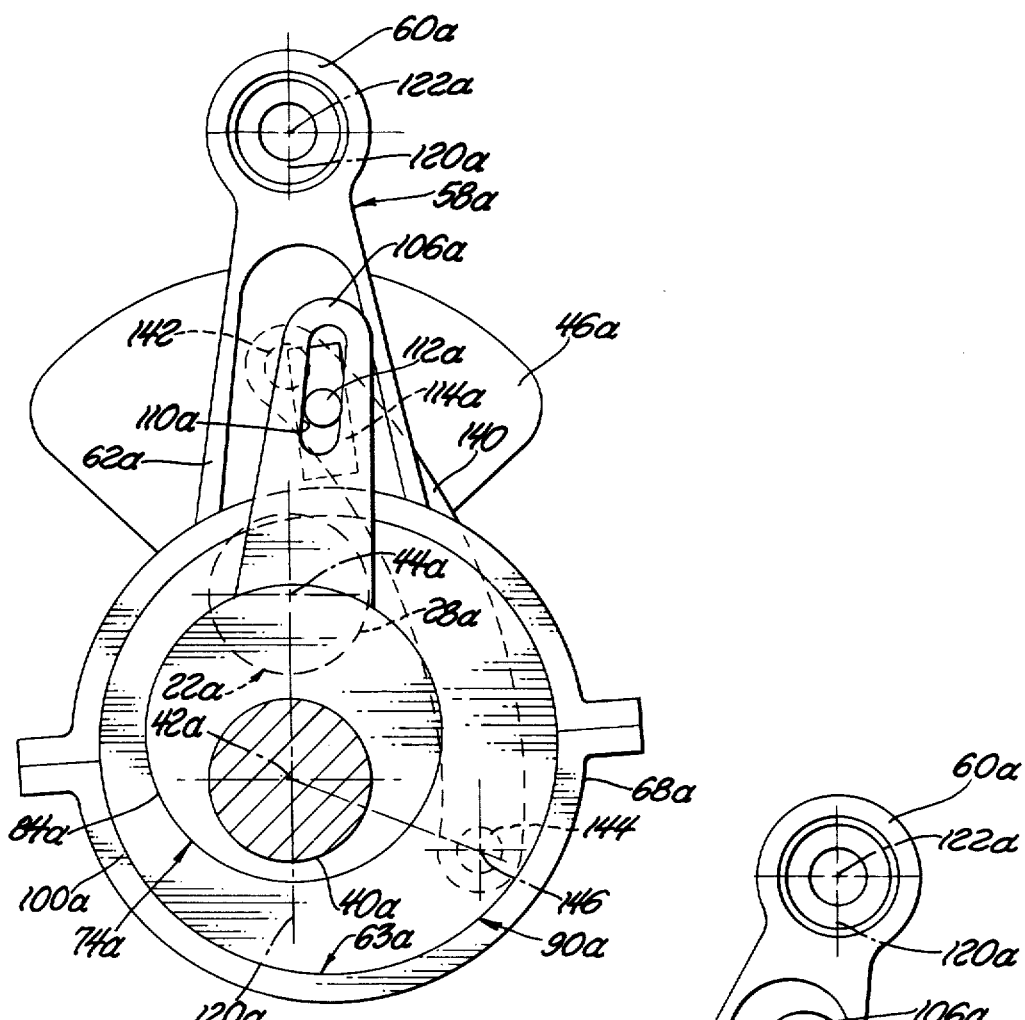
FIG. 16 is a view of the same elements shown in FIGS. 14 and 15 but illustrated in a fourth selected position of operation different from that of FIGS. 13, 14 and 15.
Figure 17:
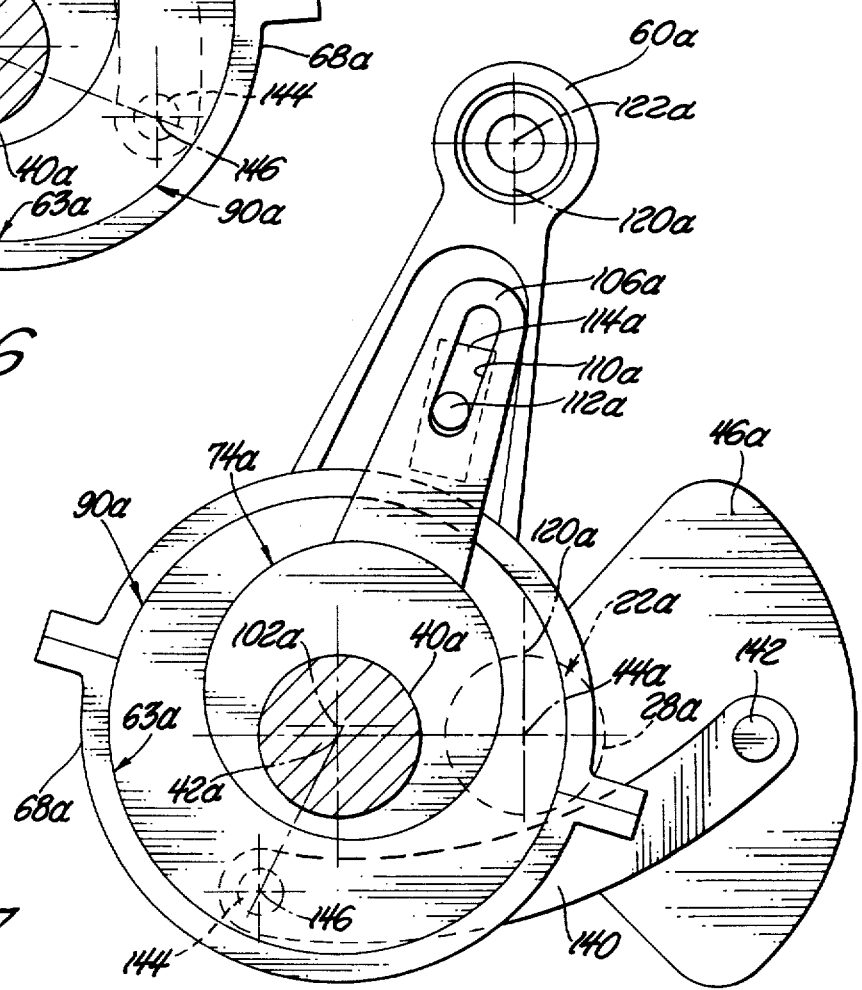
FIG. 17 is a view of the same elements shown in FIGS. 14, 15 and 16 but illustrated in a fifth selected position of operation different from that of FIGS. 13, 14, 15 and 16.

Upon continued rotation of crankshaft means 22a, outer eccentric means 90a continues its rotation about inner eccentric 74a and, as the crankshaft means 22a attains its FIG. 16 depicted position, the radially thickest portion of outer eccentric means 90a is disposed generally to the right (as viewed in FIG. 16) of the inner eccentric 74a thereby resulting in the inner eccentric means 74a being, generally, most closely disposed at its left side (as viewed in FIG. 16) to the connecting rod bearing surface 63a. It should be clear that the inner eccentric bearing means 74a is not made to move toward the bearing surface 63a but rather the bearing surface 63a is made to move toward the inner eccentric means 74a by virtue of the radially thickest portion of the outer eccentric means 90a passing between the right side (as viewed in FIG. 16) of the inner eccentric bearing 74a and the coacting portion of the bearing surface means 63a. As rotation of crankshaft means 22a continues, the radially thickest portion of outer eccentric 90a finally passes between the generally bottom portion (as viewed in FIG. 17) of inner eccentric 74a and cooperating connecting rod bearing surface 63a as to be in general alignment with axes 42a and 122a, as depicted in FIG. 17, with the result that the distance between axis 42a and axis 122a is made, generally, the shortest distance. Of course, 90° further rotation of crankshaft means 22a results in the respective elements again assuming the positions depicted in FIG. 13.

Further, by way of example and not of limitation, if in the embodiment of FIGS. 13–17, the following is assumed: (a) the outer diameter 100a of outer eccentric bearing means 90a being 3.0625 inches; (b) the inner diameter 98a of outer eccentric 90a being, nominally, 2.00 inches; (c) the axes of the outer diameter 100a and inner diameter 98a being offset from each other by 0.250 inches; (d) the outer diameter 84 of inner eccentric bearing means being, nominally, 2.00 inches; (e) the inner diameter 82a of inner eccentric bearing means being, nominally, 1.0625 inches; (f) the axes of the outer diameter 84a and inner diameter 82a being offset from each other by 0.3125 inches; (g) the outer diameter of crank-pin 40a being, nominally, 1.0625 inches; (h) the distance between axis 42a and 44a being 1.25 inches; (i) the distance between crank-pin axis 42a and wrist pin axis 122a is 4.4375 inches when the crank-pin 40a is in its TDC position of FIG. 13, and (j) the distance between crankshaft axis 44a and wrist pin axis 122a is 5.6875 inches when the crank-pin 40a is in its TDC position of FIG. 13, then it can be seen, with the same applied measurements that not only has there been no downward movement of wrist pin axis 122a (and therefore piston 16a) toward axis 44a of crankshaft means 22a during the time that the crankshaft means 22a has rotated from its FIG. 13 position to its FIG. 14 position since the center distance as between wrist pin axis 122a and crankshaft axis 44a remains virtually the same, namely, 4.6875 inches. This is brought about by the fact that as crankshaft means 22a undergoes that degree of rotation, the radially thickest portion of outer eccentric means 90a is beginning to move generally between the rotated crank-pin 40a and the wrist pin axis 122a thereby in effect "make-up" the distance which crank-pin 40a has moved downwardly relative to its TDC position of FIG. 13. Such a non-moving or standing piston continues to be stationary or substantially stationary for some additional degrees of crankshaft rotation beyond the FIG. 14 position since, in the embodiment disclosed, the radially thickest portion ("high spot") of the outer eccentric means 90a has not yet fully come between crank-pin 40a and wrist pin axis 122a.

Figure 14:
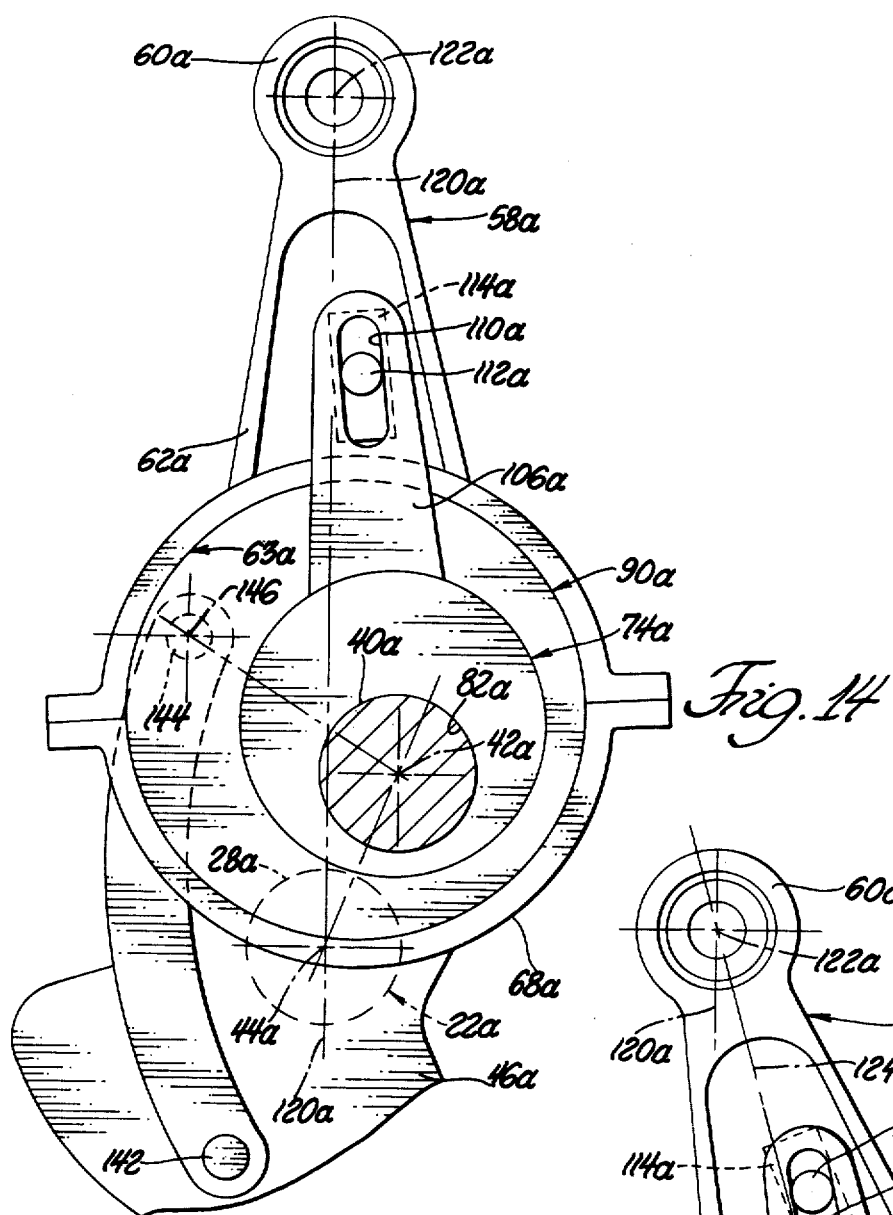
FIG. 14 is a view of certain of the elements shown in FIG. 13 but illustrated in a second selected position of operation different from that of FIG. 13.
Figure 15:
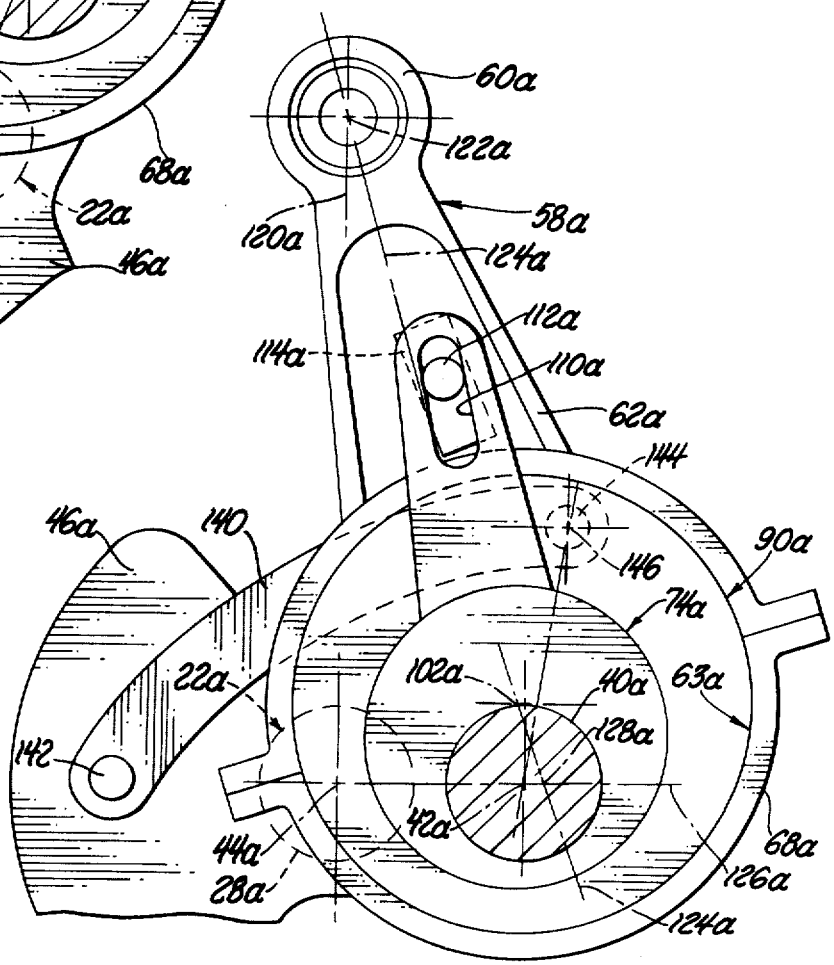
FIG. 15 is a view of the same elements shown in FIG. 15 but illustrated in a third selected position of operation different from that of FIGS. 13 and 14.

As previously generally described, as crankshaft means 22a rotation continues from the FIG. 14 position toward the FIG. 15 position, the "high spot" of the outer eccentric means 90a starts to pass generally about the right side (as viewed in FIG. 15) of the inner eccentric means 74a and crank-pin 40a. As a consequence thereof the axis 102a of the outer surface (outer diameter) 100a of eccentric bearing means 90a moves generally radially outwardly with respect to crankshaft axis 44a and becomes a radial distance greater than the distance between crankshaft means axis 44a and crank-pin axis 42a. This, in turn, causes the tangential velocity of axis 102a to be greater than the tangential velocity of crank-pin axis 42a resulting in a related increased velocity of wrist pin axis 122a (and piston 16a) toward crankshaft means 22a axis 44a. Further, if a line 124a of rection force is drawn as through wrist pin axis 122a and axis 102a, it can be seen that such force line 124a intersects the horizontal line 126a, passing through axis 42a and 44a, at a point 128a which is, under the previously assumed exemplory dimensions, 0.1563 inch further radially ourwardly disposed with respect to the axis 44a than is axis 42a. Accordingly, the FIG. 15 position pictorially illustrates that not only is the piston 16a velocity increased but that the torque applied by piston 16a to the crankshaft means 22a is increased by a torque lever arm increase. Further, when in the FIG. 15 position, and employing the same assumed dimensions and measurements, the distance between wrist pin axis 122a and crankshaft means axis 44a would be in the order of 4.500 inches.

With continued rotation of the crankshaft means 22a, from the FIG. 15 to the FIG. 16 position, the outer eccentric bearing means 90a continues its rotation as to assume a position, as depicted in FIG. 16, where the "high spot" of the eccentric means 90a is disposed, in the main, to the right (as viewed in FIG. 16) of the inner eccentric means 74a. In the FIG. 16 position, the crank-pin 40a is in its bottom-dead-center (BDC) position. Again, employing the same assumed dimensions and measurements, in the FIG. 16 position, the distance between wrist pin axis 122a and crankshaft means axis 44a would be in the order of 3.0938 inches. Accordingly, it can be seen that while the axis 42a of crank-pin 40a moved downwardly a distance of 1.250 inches (from the FIG. 15 to the FIG. 16 BDC position) wrist pin axis 122a (and therefore piston 16a) actually moved 1.406 inches downwardly, or, 0.156 inch further than axis 42a of crank-pin 40a. Since the downward distances traveled by both the axis 122a (piston 16a) and axis 42a, as between the FIG. 15 and FIG. 16 positions, occur in the same span of time, it is them obvious that the average downward velocity of axis 122a (piston 16a) must be greater than that of axis 42a and that such increased velocity is due to the "high spot" of the eccentric means 90a being rotated from a position generally between crank-pin 40a and axis 122a (depicted in FIG. 15) to a position generally to the right of crank-pin 40a (depicted in FIG. 16).

With further rotation of the crankshaft means 22a, from the FIG. 16 to the FIG. 17 position, the outer eccentric bearing means 90a continues its rotation as to assume a position, as depicted in FIG. 17, wherein the "high spot" of the eccentric means 90a is disposed at a side of the inner eccentric means 74a and crank-pin 40a generally opposite to wrist pin axis 122a thereby, in effect, shortening the distance as between axis 42a and axis 122a and, therefore, between wrist pin axis 122a and crankshaft means 22a axis 44a. That is, employing the same assumed dimensions and measurements, in the FIG. 17 position, the distance between wrist pin axis 122a and crankshaft means axis 44a would be in the order of 4.000 inches. It should be noted that the FIG. 15 position depicts the structure at 90° of rotation whereas the FIG. 17 position depicts the structure at 270° of rotation (180° apart). Accordingly, even through wrist pin axis 122a (piston 16a) moved a total of 1.406 inches downwardly from the FIG. 15 to the FIG. 16 positions, the wrist pin axis 122a (piston 16a) moved only 0.906 inches upwardly from the FIG. 16 to the FIG. 17 positions, or, a difference of 0.500 inch. Since the upward distances traveled by both the axis 122a (piston 16a) and axis 42a occur in the same span of time, it then becomes obvious that the average upward velocity of axis 122a (piston 16a) must be less than that of axis 42a and that such decreased velocity is due to the "high spot" of the eccentric means 90a being rotated from a position generally to the right of the crank-pin 40a (FIG. 16) to a position generally on the opposite side of crank-pin 40a with respect to wrist pin axis 122a. As a consequence of the relatively slower travel of wrist pin axis 122a (piston 16a) the force applied by the crank-pin 40a to the piston 16a, during such portion of travel, is relatively increased. Further, if a force line 130a is drawn as to pass through wrist pin axis 122a and axis 102a such will intersect the horizontal line 126a as at a point 132a which is, under the previously assumed exemplory dimensions, more radially inwardly (with respect to crankshaft axis 44a) than is point 128a of FIG. 15.

Consequently, any flywheel or the like associated with the crankshaft means 22a serving to move the piston 16a upwardly in its compression, exhaust or pumping stroke is better able to provide such movement because of the comparatively reduced leverarm (front point 132a to axis 44a) and therefore, effectively, a resulting increased force.

With still further rotation of the crankshaft means 22a, from the FIG. 17 back to the FIG. 13 position, the outer eccentric means 90a continues its rotation as to again assume a position as depicted in FIG. 13 wherein the "high spot" of eccentric means 90a is generally to the left of eccentric means 74a and crank-pin 40a and, generally, opposite to that as assumed in FIG. 16, thereby, in effect, again (in comparison to FIG. 17) lengthening the distance as between crankshaft axis 44a and wrist pin axis 122a (piston 16a). That is, employing the same assumed exemplory dimensions and measurements, in its downstroke, axis 122a moved in the order of a total of 2.594 inches while in half of the rotation of the crankshaft means 22a, in its upstroke direction, the wrist pin axis 122a (piston 16a) had moved in the order of only 0.906 inch (to the FIG. 17 position). Therefore, it is obvious that while crankshaft means 22a rotates from its FIG. 17 position back to its FIG. 13 position, the wrist pin axis 122a (piston 16a) must travel 1.688 inches (2.594 − 0.906 inches) and that such difference in distance traveled by the piston 16a (as between FIG. 16 to FIG. 17 and FIG. 17 to FIG. 13) is achieved mainly by the continued rotation of eccentric means 90a.

Generally, by way of summary, it can be seen that in the embodiment of FIGS. 13–17, and based on the assumed exemplary dimensions and measurements, the travel of piston 16a is virtually nil during the first approximately 22.5° of crankshaft rotation (from the crank-pin's TDC position of FIG. 13 to the FIG. 14 position); during the next 67.5° of crankshaft rotation the average velocity of the piston 16a is 0.0176 inch per degree of crankshaft rotation; during the next following 90° of crankshaft rotation the average velocity of the piston 16a is 0.0156 inch per degree of crankshaft rotation; during the next following 90° of crankshaft rotation the average velocity of piston 16a is 0.0101 inch per degree of crankshaft rotation and during the next following 90° of crankshaft rotation the average velocity of piston 16a is 0.0187 inch per degree of crankshaft rotation. Accordingly, it can be seen that in the embodiment of FIGS. 13–17, with the assumed exemplory dimensions, the highest average piston velocity (per degree of crankshaft rotation) occurs as between the positions depicted in FIGS. 17 to 13; the second highest average piston velocity (per degree of crankshaft rotation) occurs as between the positions depicted in FIGS. 14 to 15; the third highest average piston velocity (per degree of crankshaft rotation) occurs as between the positions depicted in FIGS. 15 to 16; and the slowest average piston velocity (per degree of crankshaft rotation) occurs as between the positions depicted in FIGS. 16 to 17.

As should now be totally apparent, the invention as illustrated in the embodiment of FIGS. 13-17 enables the piston 16a to remain substantially stationary at its TDC position for an extended period of time thereby enabling, in cases of, for example, internal combustion engines, the combustible mixture within the combustion chamber to burn and increase its pressure (over that achieved by the prior art) before piston 16a starts to move downwardly (in response to such combustion pressure). As the piston 16a starts to move downwardly (toward crankshaft axis 44a), its velocity is made to be almost the greatest and its effective lever or torque arm, with respect to the crankshaft axis, is made to increase thereby increasing the work delivered by the piston to the crankshaft means. The actual work applied by the piston 16a is also increased by the fact that the actual length of stroke of the piston 16a is made to increase over the stroke as would otherwise be determined by the crank-pin 40a alone. Also, the average velocity of the piston 16a being made slower as between the 90° and 270° of crankshaft rotation positions, enhances the smooth operation of the machine or engine and diminishes any tendency for "pounding" sensations or vibrations as may otherwise be induced into the engine or machine as at the bottom of the piston stroke.

It should, of course, be apparent that slot 110a may be contoured to a configuration different than that shown in FIGS. 13-17 and such configuration may be determined as generally set forth with reference to FIGS. 11 and 12.

Further, still referring to FIGS. 13-17, it can be seen that unique characteristics of relative acceleration and deceleration of rotation of eccentric means 90a are achieved by virtue of having the opposite ends of linkage means 140 pivotally secured to the crankshaft means 22a and the eccentric bearing means 90a.

For example, if the pivotal axis 146 of pivot means 144 is, for reference purposes, considered to be at a zero position as depicted in FIG. 13, then it can be seen, employing the same assumed dimensions and measurements, that is the crankshaft means 22a rotates the first 22-½° from its FIG. 13 to its FIG. 14 position, pivot pin axis 146 has rotated (with reference to axis 42a) in the order of only 17°; as the crankshaft means 22a rotates the next 67-½° from its FIG. 14 to its FIG. 15 position, pivot pin axis 146 rotates (with respect to axis 42a) in the order of 66°; as the crankshaft means 22a rotates the next 90° from its FIG. 15 to its FIG. 16 position, pivot pin axis 146 rotates (with reference to axis 42a) in the order of 103°; as the crankshaft 22a rotates the next 90° from its FIG. 16 to its FIG. 17 position, pivot pin axis 146 rotates (with respect to axis 42a) in the order of 97°; and as the crankshaft means 22a rotates the next 90° from its FIG. 17 to its FIG. 13 position, pivot pin axis rotates (with respect to axis 42a) in the order of 77°.

As should be apparent, the invention herein disclosed provides means whereby the stroke of a reciprocating piston can be controllably altered in order to provide for such desired as, for example, increased piston stroke, increased efficiency in terms of fuel for output work produced, increased torque or lever arm during the work stroke (in a combustion engine) and comparatively reduced lever arm in the compression or exhaust stroke (in a combustion engine) thereby enabling a greater force to be applied to the piston means via the crankshaft means, and the effective prolonged stopping of the piston at the top of its stroke thereby enabling a greater degree of combustion and increased gas pressure to occur before downward movement of the piston is initiated, resulting in, among other things, a reduction in the production of oxides of nitrogen ($NO_x$).

The invention as herein disclosed has been illustrated in an environment wherein the axis of motion of the piston passes through the axis of rotation of the associated crankshaft means. However, it should be made clear that the invention can be practiced equally well in an environment wherein the axis (120 or 120a) of motion of the piston does not intersect the axis (44 or 44a) of rotation of the crankshaft means as is sometimes the case as in, for example, some V-type internal combustion piston engines.

The invention as disclosed by FIGS. 1-6 illustrates the operation thereof with the eccentric means 90 being situated (in the FIG. 1 position) as to have the "high spot" thereof at an angle of approximately 15° with respect to the horizontal passing through axis 42. The relative position of such a "high spot" may be selected to be any desired position which will provide the ultimate desired results. For example, if the "high spot" of eccentric means 90 were situated at 30° instead of 15° with respect to the horizontal, the immediate difference would be that in the FIG. 3 position more of the "high spot" of eccentric means 90 would have moved between crank-pin 40 and wrist pin axis 122 thereby further adding to the effective lengthening therebetween, and, in FIG. 4, more of the "high spot" of eccentric means 90 would be to the right of crank-pin 40 and eccentric 74 thereby moving point 128 even further radially away from axis 44. Similarly, eccentric means 90a, illustrated in FIG. 13 as having its "high spot" disposed at generally at 90° relative to piston axis 120a, may also be selectively positioned as to thereby achieve the ultimate desired piston-crank stroke characteristics.

Although only two embodiments and selected modifications of the invention have been disclosed and described, it is apparent that other embodiments and modifications of the invention are possible within the scope of the appended claims.

What is claimed is:

1. In a reciprocating piston machine comprising a cylinder, a piston reciprocatingly received in said cylinder, a rotatable crankshaft having a first axis of rotation, said crankshaft comprising a crank-pin offset laterally from said first axis of rotation and having a second axis parallel to said first axis, a connecting rod having a first end pivotally mounted on said crank-pin about a third axis and pivotally connected at a second end thereof which is remote from said first end and said crank-pin to said piston, said third axis being offset laterally from said first axis, means for constraining said third axis to follow a predetermined locus as said crankshaft is rotated, said constraining means comprising relatively rotatable at least first and second eccentric bearing means operatively carried by said crank-pin as to be at least partly rotatable thereabout and at least partly rotatable within said first end of said connecting rod, and motion transmitting means operatively interconnecting said crankshaft and said connecting rod with said first and second eccentric bearing means, said motion transmitting means being effective to cause one of said rotatable eccentric bearing means to experience one complete revolution relative to said crank-pin for each complete revolution of said crankshaft about said first axis while experiencing only limited rotation and translation relative to said first end of said connecting rod, said motion transmitting means also being effective to cause the other of said at least first and second eccentric bearing means to experience one complete revolution relative to said first end of said connecting rod for each complete revolution of said crankshaft about said first axis while experiencing only limited rotation and translation relative to said crank-pin.

2. A reciprocating piston machine according to claim 1 wherein at least one of said eccentric bearing means comprises a cylindrical outer bearing surface and a cylindrical inner bearing surface, and wherein the axes of said outer and inner bearing surfaces are parallel to and spaced from each other.

3. A reciprocating piston machine according to claim 2 wherein said at least one of eccentric bearing means comprises first and second physically separate bearing body portions, wherein said first bearing body portion carries a first discontinuous portion of said inner bearing surface and a first discontinuous portion of said outer bearing surface, wherein said second bearing body portion carries a second discontinuous portion of said inner bearing surface and a second discontinuous portion of said outer bearing surface, and wherein said first and second body portions when physically connected to each other about said crank-pin enable said first and second discontinuous portions to cooperatingly define said inner and outer bearing surfaces.

4. A reciprocating piston machine according to claim 1 wherein said motion transmitting means comprises at least first and second lever means, said first lever means comprising first and second operative ends, wherein said first end is pivotally connected to one of said eccentric bearing means, and wherein said second end is pivotally connected to said crankshaft.

5. A reciprocating piston machine according to claim 1 wherein said at least one of eccentric bearing means comprises a cylindrical outer bearing surface and a cylindrical inner bearing surface, wherein the axis of said outer bearing surface and the axis of said inner bearing surface are parallel and spaced from each other, wherein said motion transmitting means comprises at least first and second lever means, said lever means comprising first and second operative ends, wherein said first end is pivotally connected to one of said eccentric bearing means as to have the pivotal axis of said first end at a fixed distance radially outwardly of said axis of said outer bearing surface, and wherein said second end is pivotally connected to said crankshaft as to have the pivotal axis of said second end at a fixed distance radially outwardly of said first axis.

6. In a reciprocating piston machine comprising a cylinder, a piston reciprocatingly received in said cylinder, a rotatable crankshaft having a first axis of rotation, said crankshaft comprising a crank-pin offset laterally from said first axis of rotation and having a second axis parallel to said first axis, a connecting rod having a first end pivotally mounted on said crank-pin about a third axis and pivotally connected at a second end thereof which is remote from said first end and said crank-pin to said piston, said third axis being offset laterally from said first axis, means for constraining said third axis to follow a predetermined locus as said crankshaft is rotated, said constraining means comprising rotatable eccentric bearing means operatively carried by said crank-pin as to be rotatable thereabout and rotatable within said first end of said connecting rod, and motion transmitting means operatively interconnecting said crankshaft and said rotatable eccentric bearing means, said motion transmitting means being effective to cause said rotatable eccentric bearing means to experience one complete revolution relative to said second axis of said crank-pin for each complete revolution of said crankshaft about said first axis, said motion transmitting means comprising lever means fixedly connected to said eccentric bearing means and having a portion operatively connected to said crankshaft for driving rotation by said crankshaft.

7. In a reciprocating piston machine comprising a cylinder, a piston reciprocatingly received in said cylinder, a rotatable crankshaft having a first axis of rotation, said crankshaft comprising a crank-pin offset laterally from said first axis of rotation and having a second axis parallel to said first axis, a connecting rod having a first end pivotally mounted on said crank-pin about a third axis and pivotally connected at a second end thereof which is remote from said first end and said crank-pin to said piston, said third axis being offset laterally from said first axis, means for constraining said third axis to follow a predetermined locus as said crankshaft is rotated, said constraining means comprising rotatable eccentric bearing means operatively carried by said crank-pin as to be rotatable thereabout and rotatable within said first end of said connecting rod, motion transmitting means operatively interconnecting said crankshaft and said rotatable eccentric bearing means, said motion transmitting means being effective to cause said rotatable eccentric bearing means to experience one complete revolution relative to said second axis of said crank-pin for each complete revolution of said crankshaft about said first axis, said motion transmitting means comprising lever means having first and second operative ends, said first end being fixedly carried by said eccentric bearing means for rotation in unison with said eccentric bearing means, said second end being swingable in unison with rotation of said eccentric bearing means, and pivotal drive connecting means operatively interconnecting said crankshaft with said swingable second end whereby said crankshaft is effective for rotatably driving said eccentric bearing means during rotation of said crankshaft about said first axis.

8. A reciprocating piston machine according to claim 7 wherein said pivotal drive connecting means comprises a drive pin and a cooperating drive slot both pivotally and slidably receiving said drive pin.

9. A reciprocating piston machine according to claim 8 wherein said drive slot is elongated, and wherein the longitudinal axis of said drive slot is directed radially of said first axis.

10. A reciprocating piston machine according to claim 8 wherein said drive pin is carried by said lever means, and wherein said drive slot is carried by said crankshaft.

11. A reciprocating piston machine according to claim 10 wherein said drive slot is elongated, and wherein the longitudinal axis of said drive slot is directed radially of said first axis.

12. A reciprocating piston machine according to claim 10 wherein said drive slot is elongated, and wherein the longitudinal axis of said drive slot is skew to said first axis.

13. A reciprocating piston machine according to claim 8 wherein said drive slot is elongated, and wherein the longitudinal axis of said drive slot is skew to said first axis.

14. A reciprocating piston machine according to claim 8 wherein said swingable second end moves translationally with respect to said crankshaft during rotation of said eccentric bearing means about said crank-pin, and wherein said drive pin and drive slot are caused to experience relative translational motion therebetween as a result of swingable second end moving translationally with respect to said crankshaft.

15. A reciprocating piston machine according to claim 14 wherein said drive slot is contoured as to thereby effect the rate of rotation of said eccentric bearing means about said crank-pin as a function of the degree to which said drive pin and said drive slot have experienced relative translational motion therebetween.

16. A reciprocating piston machine according to claim 15 wherein said drive pin is carried by said lever means, and wherein said drive slot is carried by said crankshaft.

17. In a reciprocating piston machine comprising a cylinder, a piston reciprocatingly received in said cylinder, a rotatable crankshaft having a first axis of rotation, said crankshaft comprising a crank-pin offset laterally from said first axis of rotation and having a second axis parallel to said first axis, a connecting rod having a first end pivotally mounted on said crank-pin about a third axis and pivotally connected at a second end thereof which is remote from said first end and said crank-pin to said piston, said third axis being offset laterally from said first axis, means for constraining said third axis to follow a predetermined locus as said crankshaft is rotated, said constraining means comprising rotatable eccentric bearing means operatively carried by said crank-pin as to be rotatable thereabout and rotatable within said first end of said connecting rod, and motion transmitting means operatively interconnecting said crankshaft and said rotatable eccentric bearing means, said motion transmitting means being effective to cause said rotatable eccentric bearing means to experience one complete revolution relative to said second axis of said crank-pin for each complete revolution of said crankshaft about said first axis, said eccentric bearing means comprising a first eccentric bearing and a second eccentric bearing, said first eccentric bearing and said crank-pin being relatively rotatable with respect to each other, and said second eccentric bearing and said first end of said connecting rod being relatively rotatable with respect to each other.

18. A reciprocating piston machine according to claim 17 wherein said motion transmitting means is operatively connected to said second eccentric bearing, and further comprising second motion transmitting means, said second motion transmitting means operatively interconnecting said first eccentric bearing to said connecting rod as to thereby drivingly rotate said first eccentric bearing relative to said crank-pin as said crankshaft rotates about said first axis.

19. A reciprocating piston machine according to claim 17 wherein said first eccentric bearing comprises a first cylindrical outer bearing surface and a first cylindrical inner bearing surface, wherein said second eccentric bearing comprises a second cylindrical outer bearing surface and a second cylindrical inner bearing surface, wherein said first and second eccentric bearings are journalled to each other as to have said second inner bearing surface operatively journalled on and about said first outer bearing surface.

20. A reciprocating piston machine according to claim 19 wherein said motion transmitting means is operatively connected to said second eccentric bearing, and further comprising second motion transmitting means, said second motion transmitting means operatively interconnecting said first eccentric bearing to said connecting rod as to thereby enable said connecting rod to drivingly rotate said first eccentric bearing about said crank-pin as said crankshaft rotates about said first axis.

21. A reciprocating piston machine according to claim 20 wherein said first mentioned motion transmitting means comprises lever means having first and second operative ends, wherein said first end is fixedly carried by said second eccentric bearing for rotation in unison with said second eccentric bearing, wherein said second end is swingable in unison with rotation of said second eccentric bearing, and further comprising pivotal drive connecting means operatively interconnecting said crankshaft with said swingable second end whereby said crankshaft is effective for rotatably driving said second eccentric bearing during rotation of said crankshaft about said first axis.

22. A reciprocating piston machine according to claim 21 wherein said second motion transmitting means comprises second lever means having first and second operative ends, wherein said first end of said second lever means is fixedly carried by said first eccentric bearing for movement in unison therewith, and further comprising second pivotal drive connecting means operatively interconnecting said second end of said second lever means to said connecting rod, said first mentioned pivotal drive connecting means comprising a first drive pin and a first cooperating drive slot which both pivotally and slidably receives said first drive pin, and said second pivotal drive connecting means comprising a second drive pin and a second drive slot which both pivotally and slidably receives said second drive pin.

23. A reciprocating piston machine according to claim 22 wherein said first drive slot is elongated, wherein the longitudinal axis of said first drive slot is directed generally radially of said first axis, wherein said second drive slot is elongated, and wherein the longitudinal axis of said second drive slot is directed generally radially of said second axis.

24. A reciprocating piston machine according to claim 22 wherein said first drive pin is carried by said first mentioned lever means, and wherein said first drive slot is carried by said crankshaft.

25. A reciprocating piston machine according to claim 22 wherein said second drive pin is carried by said connecting rod, and wherein said second drive slot is carried by said second lever means.

26. A reciprocating piston machine according to claim 22 wherein said second lever means moves translationally with respect to said connecting rod when said crankshaft undergoes rotation about said first axis, and wherein said second drive pin and second drive slot are caused to experience relative translational motion therebetween as a result of said lever means translationally moving with respect to said connecting rod.

27. A reciprocating piston machine according to claim 20 wherein said first mentioned motion transmitting means comprises lever means, said lever means comprising first and second operative ends, wherein said first operative end is pivotally connected to said second eccentric bearing, and wherein said second end is pivotally connected to said crankshaft.

28. A reciprocating piston machine according to claim 27 wherein said first end is pivotally connected to said second eccentric bearing as to have the pivotal axis of said first end at a fixed distance radially outwardly of the axis of said second cylindrical inner bearing surface, and wherein said second end is pivotally connected to said crankshaft as to have the pivotal axis of said second end at a fixed distance radially outwardly of said first axis.

* * * * *